United States Patent [19]

Meyer

[11] 4,374,222

[45] Feb. 15, 1983

[54] COMPOSITIONS CONTAINING MOLD RELEASE AGENTS

[75] Inventor: Louis W. Meyer, Lake Jackson, Tex.

[73] Assignee: The Dow Chemical Company, Midland, Mich.

[21] Appl. No.: 306,997

[22] Filed: Sep. 30, 1981

Related U.S. Application Data

[63] Continuation-in-part of Ser. No. 239,279, Mar. 2, 1981, abandoned.

[51] Int. Cl.³ .............................................. C08K 5/16
[52] U.S. Cl. ................................................ 524/241
[58] Field of Search ................... 260/32.6 R; 524/241

[56] References Cited

U.S. PATENT DOCUMENTS

| 3,236,929 | 2/1966 | Jupa et al. ..................... 260/32.6 R |
| 3,382,202 | 5/1968 | Forrester et al. ................ 260/37 N |
| 3,396,137 | 8/1968 | Wharton ...................... 260/32.6 R |
| 3,439,007 | 4/1969 | Milks ................................. 525/6 |
| 3,515,754 | 6/1970 | Mod et al. ..................... 260/32.6 R |
| 3,538,123 | 11/1970 | Mod et al. ..................... 260/32.6 R |
| 3,639,518 | 2/1972 | Davies et al. ........................ 525/6 |

Primary Examiner—Joseph L. Schofer
Assistant Examiner—N. Sarofim
Attorney, Agent, or Firm—J. G. Carter

[57] ABSTRACT

Hydroxyl substituted fatty acid amides are employed as mold release agents in the preparation of molded articles from polyurethane-forming compositions. Polyol compositions containing such mold release agents are also disclosed.

28 Claims, No Drawings

COMPOSITIONS CONTAINING MOLD RELEASE AGENTS

CROSS REFERENCE TO RELATED APPLICATION

This application is a continuation in part of 06/239,279 Mar. 2, 1981 abandoned.

BACKGROUND OF THE INVENTION

Polyether polyurethane moldings are being increasingly used in the manufacture of automobiles and furniture and in home construction. Molded polyether polyurethanes are especially important because they are lightweight and are resistant to moisture, weather, temperature extremes, and aging. As an illustration, molded polyether polyurethane elastomers have become of special interest in the manufacture of force-reducing impact media such as safety impact bumpers for automotive vehicles and impact resistant automotive fascia.

The high demand for molded polyether polyurethane articles requires that they be produced in the largest numbers in the shortest possible time. Polyurethane-forming mixtures are eminently suited for mass production because the reactants are liquid, that is they are pumpable, and are quick-reacting. The problem has existed, however, in providing adequate mold release in the shortest possible time to take fullest advantage of the unique capabilities of the polyurethane systems.

This invention relates to the improved release of polyurethane compositions from molds in which they are formed and shaped as well as to polyol compositions suitable for such use.

Heretofore, release of molded articles from molds in which they have been formed has been achieved by coating the surface of the mold cavity with an agent which facilitates release of the molded article from the walls of the mold cavity. Procedures such as this are described in U.S. Pat. Nos. 3,694,530, 3,640,769, 3,624,190, 3,607,397 and 3,413,390. This procedure has certain disadvantages. The agent, after molding, adheres to the surface of the molded article thereby removing such from the surface of the mold. As the mold release agent is removed from the mold surface, it must therefore be replaced so as to provide continued release of the molded articles from the mold. The necessity for repeated additions of mold release agent results in additional expense due to low productivity as a result of the additional time incurred in applying such additional quantities of mold release agents to the mold surfaces.

In addition, mold build-up may become a problem, since a fine film of urethane is left in spot areas of the mold surface. This build-ups on the surface of the mold cavity walls and eventually covers and obscures any detail on the mold cavity surface desired to be imparted to the molded article. Also, the presence of the release agent adhering to the surface of the molded article can impede subsequent operations on the article, such as painting or adhering operations. While it is possible to clean the surfaces of molded articles in preparation for painting or adhering operations, this adds to the time and expense of production.

Additionally, the need to reapply the release agent after each molding or a limited number of moldings interrupts the molding operation and slows down output.

The use of internal mold release agents for use in molding polyurethane articles has been disclosed by Godlewski in U.S. Pat. No. 4,024,088, Bonin et al. in U.S. Pat. No. 4,098,731, Sparrow et al. in U.S. Pat. No. 4,130,698 and Godlewski in U.S. Pat. No. 4,111,861.

Many of these internal mold release agents bleed or creep to the surface of the molded article necessitating a removal operation before such articles can be painted.

The present invention is therefore more particularly directed to the use of internal mold release agents which do not bleed or creep to the surface of the molded article which results in either the mobility to paint the surface of the article or else the surface of the article must be treated prior to painting thereof. Some of the mold release agents also act as a compatabilizer for mixtures of relatively high equivalent weight polyols and relatively low equivalent weight active hydrogen-containing compounds.

SUMMARY OF THE INVENTION

One aspect of the present invention is directed to an improvement in preparing molded articles by injecting a polyurethane-forming composition into a mold and thereafter removing a resultant molded article wherein the improvement resides in employing as said polyurethane-forming composition one which contains an effective amount of, as a mold release agent, at least one fatty acid amide having at least one of the hydrogen atoms attached to the nitrogen of an amide group replaced with a hydroxyl-containing substituent.

Another aspect of the present invention pertains to compositions consisting essentially of (A) a mixture of (1) at least one relatively high equivalent weight material containing at least 2 hydroxyl groups and (2) at least one relatively low equivalent weight material containing a plurality of at least one member selected from OH and $NH_2$ groups or at least one of each such groups; and (B) an effective quantity of at least one fatty acid amide having at least one of the hydrogen atoms attached to the nitrogen atom of an amide group replaced with a hydroxyl-containing substituent such that when said composition is employed in a polyurethane-forming composition from which molded articles are prepared, the release of said molded articles from the mold from which they are prepared is improved in comparison to the release of articles molded from such composition in the absence of said substituted fatty acid amide mold release agent.

Another aspect of the present invention pertains to a composition consisting essentially of (A) one or more materials containing a plurality of active hydrogen atoms and (B) an effective quantity of at least one fatty acid amide having at least one of the hydrogen atoms attached to the nitrogen atom of an amide group replaced with a hydroxyl-containing substituent such that when said composition is employed in a polyurethane-forming composition from which molded articles are prepared, the release of said molded articles from the mold from which they are prepared is improved in comparison to the release of articles molded from such composition in the absence of said substituted fatty acid amide mold release agent.

DETAILED DESCRIPTION OF THE INVENTION

Suitable fatty acid amides containing hydroxyl-containing substituents which can be employed as internal mold release agents herein include, for example, those represented by the formula:

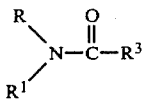 FORMULA I wherein each R and $R^1$ is independently hydrogen or a group represented by the formulas

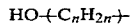 FORMULA II or

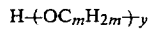 FORMULA III;

n has a value from 1 to about 4, preferably from 2 to about 3; each m independently has a value from 2 to about 4, preferably 2 or 3; y has a value of from 1 to about 6, preferably from 1 to about 2; and $R^3$ is a saturated or unsaturated aliphatic group having from about 8 to about 50, preferably from about 10 to about 24 carbon atoms with the proviso that at least one of R and $R^1$ contains a hydroxyl group.

Particularly suitable materials which can be employed herein as the internal mold release agent include, for example,
N,N-bis(2-hydroxyethyl)stearamide,
N,N-bis(2-hydroxyethyl)lauramide,
N,N-bis(2-hydroxyethyl)palmitamide,
N,N-bis(2-hydroxyethyl)oleamide,
N,N-bis(2-hydroxyethyl)linoleamide,
N,N-bis(2-hydroxyethyl)ricinoleamide,
N,N-bis(2-hydroxyethyl)cocoyl sarcosinamide,
N-(2-hydroxyethyl)stearamide
N,N-bis(2-hydroxypropyl)stearamide a compound represented by the Formula I wherein each R and $R^1$ is represented by the Formula III wherein m is 3 and y is 6 and $R^3$ is a heptadecyl group, and mixtures thereof.

Some of the mold release agents can additionally act as a compatabilizer for an incompatable mixture of (A) at least one relatively high molecular weight polyol and (B) at least one relatively low molecular weight active hydroxyl-containing material. Particularly suitable are the N,N-bis(2-hydroxylethyl)lauramide commercially available from Mona Industries, Inc. as MONAMID 150 LWA, MONAMID 150 LW, MONAMID 150 LMWC; N,N-bis(2-hydroxyethyl)stearamide commercially available from Mona Industries, Inc. as MONAMID 718; and N,N-bis(2-hydroxyethyl)isostearamide commercially available from Scher Chemicals, Inc. as SHERCOMID SI.

The mold release agents are suitably employed in quantities from about 0.05 to about 10, preferably from about 2 to about 4, parts per 100 parts by weight of total active hydrogen containing material employed.

In those instances where it is desirable, the substituted fatty acid amide material and the active hydrogen containing material can be employed as a concentrate wherein it is later (a) diluted with or (b) employed with one or more of the active hydrogen-containing components but as separate streams when forming a polyurethane-forming mixture in which instance the quantity of substituted fatty acid amide can be employed at concentrations up to the miscibility limit of the mixture. By miscibility limit it is meant that the components can be readily mixed so as to form a relatively uniform mixture of the components even though the components of the mixture may be mutually insoluble such that any relatively uniform mixture formed therefrom is not stable over prolonged periods.

Suitable materials which can be employed herein as relatively high equivalent weight hydroxyl-containing materials having an average active hydrogen functionality of from 2 to about 8, preferably from 2 to 4 and an average active hydrogen equivalent weight of from about 500 to about 5000, preferably from about 1000 to about 3000.

Suitable materials which can be employed herein as relatively low equivalent weight active hydrogen-containing materials include one or more of any such materials containing either hydroxyl groups, primary amine groups, secondary amine groups or mixtures of such groups; such materials having an average active hydrogen functionality of from about 2 to about 16, preferably from about 2 to about 8 and an average active hydrogen equivalent weight of from about 15 to about 500, preferably from about 32 to about 200 and when the active hydrogen atoms are derived only from OH groups then the maximum equivalent weight is about 200.

For purposes of the present invention, the active hydrogen equivalent weight is determined by dividing the molecular weight by all of the hydrogen atoms contained in material derived from OH, $-NH_2$ and $>NH$ groups, regardless of whether or not the group reacts with an NCO or NCS group when preparing molded polyurethane articles.

Suitable relatively high molecular weight hydroxyl-containing polyols which can be employed herein include, for example, those polyether and polyester polyols which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500 including mixtures thereof.

Suitable relatively high molecular weight polyether polyols which can be employed herein include those which are prepared by reacting an alkylene oxide, halogen substituted or aromatic substituted alkylene oxides or mixtures thereof with an active hydrogen-containing initiator compound.

Suitable such oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4′-diaminodiphenylmethane, 4,4′-diaminodiphenylmethane, 1,3-phenylenediamine, 1,4-phenylenediamine, naphthylene-1,5-diamine, triphenylmethane-4,4′,4″-triamine, 4,4′-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other suitable relatively high molecular weight polyols which can be employed herein include polymer-containing polyols such as, for example, those disclosed in U.S. Pat. Nos. Re. 29,118 (Stamberger), 28,715 (Stamberger), 29,014 (Pizzini et al) and U.S. Pat. No. 3,869,413 (Blankenship et al) all of which are incorporated herein by reference.

Also suitable relatively high molecular weight active hydrogen-containing materials are the products resulting from aminating the polyether and polyester polyols described above.

Suitable relatively low molecular weight polyols which can be employed herein include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylenetriamine, mixtures thereof and the like.

Suitable relatively low molecular weight amine-containing active hydrogen containing materials which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof and the like.

Also suitable relatively low molecular weight active hydrogen-containing materials are the aminated polyoxyalkylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which can be employed herein as a relatively low molecular weight active hydrogen-containing material include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4''-triamine, 4,4'-di-(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethany, 4,4'-methylene-bis(2,6-diisopropylaniline), mixtures thereof and the like.

Suitable polyisocyanates include the organic aromatic and aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanat, naphthalenediisocyanate, polymethylene polyphenylisocyanates, mixtures thereof and the like.

Also suitable are organic aromatic polyisocyanates and the prepolymers prepared from such polyisocyanates and compounds having 2 or more active hydrogen atoms.

Suitable organic aliphatic polyisocyanates include, in addition to the hydrogenated derivatives of the above mentioned organic aromatic polyisocyanates, 1,6-hexamethylene diisocyanate, 1,4-cyclohexyl diisocyanate, 1,4-bis-isocyanatomethyl-cyclohexane, mixtures thereof and the like.

Also suitable are the corresponding polyisothiocyanates.

The polyurethanes can be prepared either in the presence or absence of a catalyst. Those polyurethanes prepared from amine containing polyols do not usually require a catalyst although catalysts can be employed if desired. On the other hand, those polyurethanes prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis-(2-dimethylaminoethyl)ether, N-methyl-morpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like in U.S. Pat. No. 4,126,741 (Carleton et al) all of which are incorporated herein by reference.

The zwitterions can also function as a catalyst for urethane formation i.e. the NCX—OH reaction.

If desired, the densities of the polyurethanes produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; L-520, L-5320 and L-5340 commercially available from Union Carbide Corp.; and B-1048 commercially available from PH. Goldschmidt, AG., mixtures thereof and the like.

The polyurethanes may additionally contain, if desired, coloring agents, fire retardant agents, fillers, modifiers and the like.

Suitable liquid and solid modifiers are disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) and ¼ inch (0.64 cm) and the like. Other particularly suitable fillers are mica, wollastonite, and the like.

The components which react to form the polyurethanes can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for RIM applications include those disclosed in the aforementioned articles by Ludwico et al, Gerkin et al, British Pat. No. 1,534,258 and the book by F. Melvin Sweeney all of which are incorporated herein by reference.

When injecting a relatively rapid-setting blend into massive metal molds, it may be necessary in order for the molded article to have good surface characteristics to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The following examples are illustrative of the present invention and are not to be construed as to limiting the scope thereof in any manner.

Following is a list of materials employed in the examples and comparative experiments.

For purposes of simplicity, all of the active hydrogen-containing materials employed herein are referred to as polyols regardless of whether the active hydrogen is a hydroxyl group or an amine group.

Polyol A is the reaction product of glycerine and propylene oxide at a molar ratio of about 1 to 6 respectively and having an equivalent weight of about 150.

Polyol B is the reaction product of Polyol A with propylene oxide and subsequently end-capped with ethylene oxide. The amount of ethylene oxide is about 17% by weight of the total amount of oxide added. The hydroxyl equivalent weight is about 2361.

Polyol C is ethylene glycol having an active hydrogen equivalent weight of about 31.

Polyol D is an aminated polyoxypropylene glycol represented by the formula

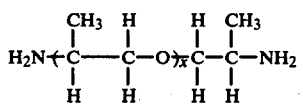

wherein x has a value of about 5.6. This product has an average amine hydrogen equivalent weight of about 100 and is commercially available from Jefferson Chemical Co. as JEFFAMINE D-400.

Polyisocyanate A is a liquid, modified diphenylmethane diisocyanate containing a high percentage of pure diphenylmethane diisocyanate and a lesser amount of polycarbodiimide adducts commercially available from The Upjohn Company as ISONATE 143L. The average NCO equivalent weight is about 143.

Catalyst A is an organo-tin compound commercially available from Witco Chemical Company as FOMREZ UL-24.

Mold Release Agent A and is N,N-bis(2-hydroxyethyl)stearamide.

EXAMPLES 1-2 and COMPARATIVE EXPERIMENTS A-B

Polyurethane forming formulations were prepared and were hand cast into a 4"×12"×½" (10.16 cm×30.48 cm×1.27 cm) container made from aluminum foil, which in turn had two strips of ½ inch (1.27 cm) stainless steel scrim placed in the bottom of the container with double back adhesive tape. After casting, the samples were cured for 10 minutes at 150° F. (65.5° C.) in a small oven. Upon removal from the oven attempts were made to peel the aluminum foil from the casting by hand. This was not possible with the samples from Comparative Experiments A and B. With Examples 1 and 2 the aluminum foil peeled from the molded part very easily. After this go-no-go procedure, the samples were then placed in an Instron testing machine and the steel scrim stock was pulled from the 4"×8" (10.16 cm×20.32 cm) molded at a rate of 20 in/min (50.8 cm/min). The force to peel the scrim stock from the sample was recorded.

The components of the formulations and results are given in the following Table I.

TABLE I

| COMPONENT & RESULTS | Ex. 1 | COMP. EXPT. A | EX. 2 | COMP. EXPT B |
|---|---|---|---|---|
| Polyol B, pbw* | 100 | 100 | 100 | 100 |
| Polyol C, pbw | 10 | 10 | 14 | 14 |
| Polyol D, pbw | 5 | 5 | 7.5 | 7.5 |
| Polyisocyanate A, pbw | 61 | 61 | 83.6 | 83.6 |
| Catalyst A, cc | 0.25 | 0.25 | 0.25 | 0.25 |
| Mold Release Agent, type/pbw | A/4 | none | A/4 | none |
| Pull Force (average), | | | | |
| lbs. | 0.25 | 13 | 0.25 | 13 |
| gms. | 113.4 | 5896.7 | 113.4 | 5896.7 |

*pbw = parts by weight

To determine the repeatability of release from a single cavity the formulations of Examples 1 and 2 and Comparative Experiments A and B were cast into a small cupcake mold cavity then cured for three minutes at 150° F. (65.5° C.) in an oven. Examples 1 and 2 showed good and consistent release through seven castings after which a slight mold build-up about the size of a pin head could be detected. Comparative Experiments A and B could not be removed from the mold.

EXAMPLE 3 and COMPARATIVE EXPERIMENT C

This example demonstrates the ability of some of the mold release agents to function as a compatabilizer for a mixture of relatively high molecular weight hydroxyl-containing material and a relatively low molecular weight active hydrogen-containing material.

Polyols B, C and D were first blended together at room temperature under shear mixing. The mold release agent, N,N,bis(2-hydroxyethyl)stearamide, was then melted at approximately 150° F. (65.5° C.), and added to the mixture being blended. After 20 minutes agitation each of the resultant blends were water clear and stable, i.e., free from phase separation.

The formulations and results are given in the following Table II.

TABLE II

| COMPONENT & RESULTS | EX. 3 | COMP. EXPT. C |
|---|---|---|
| Polyol B, ppbw[1] | 100 | 100 |
| Polyol C, pbw | 7.5 | 7.5 |
| Polyol D, pbw | 18 | 18 |
| Compatibilizer type/pbw | A/4 | none |
| Phase Separation[2], days | >30[3] | 3 |

[1]pbw = parts by weight
[2]The number of days for the formulation to begin separating into two or more distinct phases was recorded.
[3]The sample was still a single phase after 30 days at which time the test was stopped.

I claim:

1. In a process for the preparation of molded articles by injecting a polyurethane-forming composition containing at least one active hydrogen-containing material and at least one material containing an average of more than one —NCO group per molecule into a mold and thereafter removing a resultant polyurethane molded article therefrom; the improvement which comprises employing as said polyurethane-forming composition one which contains an effective amount of, as a mold release agent, at least one fatty acid amide having at least one of the hydrogen atoms attached to the nitrogen of an amide group replaced with a hydroxyl-containing substitutent.

2. The process of claim 1 wherein said fatty acid amide mold release agent is one or more of those represented by the formula

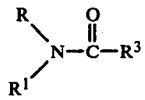   FORMULA I wherein each R and $R^1$ is independently hydrogen or a group represented by the formulas

   FORMULA II or

   FORMULA III;

n has a value from 1 to about 4; each m independently has a value from 2 to about 4; y has a value of from 1 to about 6; and $R^3$ is a saturated or unsaturated aliphatic group having from about 8 to about 50 carbon atoms, with the proviso that at least one of R and $R^1$ contains a hydroxyl group.

3. The process of claim 2 wherein each R and $R^1$ is a group other than hydrogen.

4. The process of claim 3 wherein n has a value of from 2 to about 3; each m independently has a value of 2 or 3; y as a value of 1 or 2 and $R^3$ has from about 10 to about 24 carbon atoms.

5. The process of claim 4 wherein said fatty acid amide mold release agent is at least one of
N,N-bis(2-hydroxyethyl)stearamide,
N,N-bis(2-hydroxyethyl)lauramide,
N,N-bis(2-hydroxyethyl)palmitamide,
N,N-bis(2-hydroxyethyl)oleamide,
N,N-bis(2-hydroxyethyl)linoleamide,
N,N-bis(2-hydroxyethyl)ricinoleamide,
N,N-bis(2-hydroxyethyl)cocoyl sarcosinamide,
N-(2-hydroxyethyl)stearamide, or
N,N-bis(2-hydroxypropyl)stearamide.

6. The process of claim 5 wherein said fatty acid amide mold release agent is at least one of
N,N-bis(2-hydroxyethyl)lauramide,
N,N-bis(2-hydroxyethyl)stearamide or
N,N-bis(2-hydroxyethyl)isostearamide.

7. The process of claims 1, 2, 3, 4, 5 or 6 wherein mold release agent is present in a quantity of from about 0.005 to about 10 parts per 100 parts by weight of total active hydrogen-containing material employed.

8. The process of claim 1 wherein said mold release agent is present in a quantity of from about 2 to about 4 parts per 100 parts by weight of total active hydrogen-containing material employed.

9. A composition consisting essentially of
(A) a mixture suitable as a reactant with polyisocyanates in the preparation of polyurethanes, and of
  (1) at least one relatively high equivalent weight material containing at least 2 hydroxyl groups and
  (2) at least one relatively low equivalent weight material containing a plurality of at least one member selected from OH and $NH_2$ groups or at least one of each such groups; and
(B) at least one fatty acid amide having at least one of the hydrogen atoms attached to the nitrogen atom of an amide group replaced with a hydroxyl-containing substituent; and
wherein component (B) is present in a quantity of from about 0.05 parts per 100 parts by weight of component (A) up to the miscibility limit of the mixture.

10. A composition of claim 9 wherein each material of component (A-1) has an average functionality of from about 2 to about 8 and an average hydroxyl equivalent weight of from about 500 to about 5000; each material of component (A-2) has an average active hydrogen functionality of from about 2 to about 16 and an active hydrogen equivalent weight of from about 15 to about 500 with the proviso that when such material contains only hydroxyl groups as the source of active hydrogen atoms then the maximum equivalent weight is about 200; and component (B) is at least one substituted fatty acid amide represented by the formula

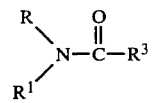

FORMULA I wherein each R and $R^1$ is independently hydrogen or a group represented by the formulas $HO{-}(C_nH_{2n}){-}$      FORMULA II or $H{-}(OC_mH_{2m}){-}_y$      FORMULA III;

n has a value from 1 to about 4; each m independently has a value from 2 to about 4; y has a value of from 1 to about 6; and $R^3$ is a saturated or unsaturated aliphatic group having from about 8 to about 50 carbon atoms, with the proviso that at least one of R and $R^1$ contains a hydroxyl group.

11. A composition of claim 10 wherein each material of component (A-1) has an average functionality of from about 2 to about 4 and an average equivalent weight of from about 1000 to about 3000; each material of component (A-2) has an average functionality of from about 2 to about 8 and an average equivalent weight of from about 32 to about 200; and each R and $R^1$ of each material in component (B) is a group represented by formulas 2 or 3.

12. A composition of claim 11 wherein component (A-1) is a polyether polyol or mixture of such polyols and in component (B) n has a value of from 2 to about 3 and each m independently has a value of 2 or 3, y has a value of 1 or 2 and $R^3$ has a value of from about 10 to about 24.

13. A composition of claim 12 wherein component (B) is at least one of
N,N-bis(2-hydroxyethyl)stearamide,
N,N-bis(2-hydroxyethyl)lauramide,
N,N-bis(2-hydroxyethyl)palmitamide,
N,N-bis(2-hydroxyethyl)oleamide,
N,N-bis(2-hydroxyethyl)linoleamide,
N,N-bis(2-hydroxyethyl)ricinoleamide,
N,N-bis(2-hydroxyethyl)cocoyl sarcosinamide,
N-(2-hydroxyethyl)stearamide, or
N,N-bis(2-hydroxypropyl)stearamide.

14. A composition of claim 13 wherein component (B) is at least one of
N,N-bis(2-hydroxyethyl)lauramide,
N,N-bis(2-hydroxyethyl)stearamide or
N,N-bis(2-hydroxyethyl)isostearamide.

15. A composition of claims 9, 10, 11, 12, 13 or 14 wherein component (B) is present in an amount of from about 0.05 to about 10 parts by weight per 100 parts by weight of component (A).

16. A composition of claim 15 wherein component (B) is present in an amount of from about 2 to about 4 parts per 100 parts by weight of component (A).

17. A composition consisting essentially of a mixture of
(A) one or more materials suitable as reactants with polyisocyanates in the preparation of polyurethanes and containing a plurality of active hydrogen atoms and
(B) at least one fatty acid amide having at least one of the hydrogen atoms attached to the nitrogen atom of an amide group replaced with a hydroxyl-containing substituent;
wherein component (B) is present in an quantity up to the miscibility limit of the mixture.

18. A composition of claim 17 wherein component (A) contains, as the sole source of active hydrogen atoms, at least one material having an average hydroxyl functionality of from about 2 to about 8 and an active hydroxyl equivalent weight of from about 31 to about 5000 and component (B) is at least one substituted fatty acid amide represented by the formula

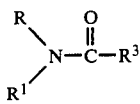   FORMULA I wherein each R and $R^1$ is independently hydrogen or a group represented by the formulas

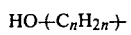   FORMULA II or

   FORMULA III;

n has a value from 1 to about 4; each m independently has a value from 2 to about 4; y has a value of from 1 to about 6; and $R^3$ is a saturated or unsaturated aliphatic group having from about 8 to about 50 carbon atoms, with the proviso that at least one of R and $R^1$ contains a hydroxyl group.

19. A composition of claim 18 wherein component (A) contains at least one polyether polyol having an average hydroxyl functionality of from about 2 to about 4 and an average hydroxyl equivalent weight of from about 1000 to about 3000 and each R and $R^1$ of each material in component (B) is a group represented by formulas 2 or 3 wherein n has a value from 2 to about 4; each m independently has a value of from 2 to about 3; y has a value of from 1 to about 2 and $R^3$ has from 10 to about 24 carbon atoms.

20. A composition of claim 19 wherein component (B) is at least one of
N,N-bis(2-hydroxyethyl)stearamide,
N,N-bis(2-hydroxyethyl)lauramide,
N,N-bis(2-hydroxyethyl)palmitamide,
N,N-bis(2-hydroxyethyl)oleamide,
N,N-bis(2-hydroxyethyl)linoleamide,
N,N-bis(2-hydroxyethyl)ricinoleamide,
N,N-bis(2-hydroxyethyl)cocoyl sarcosinamide,
N-(2-hydroxyethyl)stearamide, or
N,N-bis(2-hydroxypropyl)stearamide.

21. A composition of claim 20 wherein component (B) is at least one of
N,N-bis(2-hydroxyethyl)lauramide,
N,N-bis(2-hydroxyethyl)stearamide or
N,N-bis(2-hydroxyethyl)isostearamide.

22. A composition of claims 17, 18, 19, 20 or 21 wherein component (B) is present in an amount of from about 0.05 to about 10 parts per 100 parts by weight of component (A).

23. A composition of claim 22 wherein component (B) is present in an amount of from about 2 to about 4 parts per 100 parts by weight of component (A).

24. A composition of claims 9, 10, 11, 12, 13, 14, 17, 18, 19, 20 or 21 which additionally contains minor quantities of one or more of any combination of cell control agents, fire retardant agents, coloring agents or catalysts for reacting a material containing an NCO and/or an NCS group with an active hydrogen containing material and/or with another NCO or NCS group.

25. A composition of claim 15 which additionally contains minor quantities of one or more of any combination of cell control agents, fire retardant agents, coloring agents, blowing agents or catalysts for reacting a material containing an NCO and/or an NCS group with an active hydrogen containing material and/or with another NCO or NCS group.

26. A composition of claim 16 which additionally contains minor quantities of one or more of any combination of cell control agents, fire retardant agents, coloring agents, blowing agents or catalysts for reacting a material containing an NCO and/or an NCS group with an active hydrogen containing material and/or with another NCO or NCS group.

27. A composition of claim 21 which additionally contains minor quantities of one or more of any combination of cell control agents, fire retardant agents, coloring agents, blowing agents or catalysts for reacting a material containing an NCO and/or an NCS group with an active hydrogen containing material and/or with another NCO or NCS group.

28. A composition of claim 22 which additionally contains minor quantities of one or more of any combination of cell control agents, fire retardant agents, coloring agents, blowing agents or catalysts for reacting a material containing an NCO and/or an NCS group with an active hydrogen containing material and/or with another NCO or NCS group.

* * * * *

UNITED STATES PATENT AND TRADEMARK OFFICE
CERTIFICATE OF CORRECTION

PATENT NO. : 4,374,222

DATED : February 15, 1983

INVENTOR(S) : Louis W. Meyer

It is certified that error appears in the above—identified patent and that said Letters Patent is hereby corrected as shown below:

Col. 6, line 29; "4,4'-diaminodiphenylmethany" should read --4,4'-diaminodiphenylmethane--.

Col. 6, line 38; "p-phenylenediisocyanat" should read --p-phenylenediisocyanate--.

Col. 10, Table II, line 1; "ppbw$^1$" should read --pbw$^1$--.

Col. 10, line 47, Claim 1; "substitutent" should read --substituent--.

Col. 13, line 3, Claim 17; "an" should read --a--.

Col. 13, line 25, Claim 18; "H$-(-OC_mH_{2n}-)-_y$" should read --H$-(-OC_mH_{2m}-)-_y$--.

Signed and Sealed this

Twenty-sixth Day of July 1983.

[SEAL]

Attest:

GERALD J. MOSSINGHOFF

*Attesting Officer*   *Commissioner of Patents and Trademarks*